March 12, 1968 R. C. TRESEDER 3,373,413

PLIABLE MAGNETIC RECORDING DISK WITH DIRECT TRANSDUCER CONTACT

Filed Oct. 30, 1963

*INVENTOR.*
ROBERT C. TRESEDER

BY *John L Jackson*

ATTORNEY 3,373,413

PLIABLE MAGNETIC RECORDING DISK WITH DIRECT TRANSDUCER CONTACT

Robert C. Treseder, San Jose, Calif., assignor to International Business Machines Corporation, New York, N.Y., a corporation of New York Filed Oct. 30, 1963, Ser. No. 320,210
3 Claims. (Cl. 340—174.1)

ABSTRACT OF THE DISCLOSURE

A stretched, annular membrane magnetic recording disk having a magnetic recording surface, which is under tension at tension points spaced substantially equidistant around its circumference to provide a recording surface, small areas of which are optically flat and which is pliable for contact recording.

This invention relates to magnetic recording in general and more particularly to an apparatus in which a pliable stretched magnetic recording medium is used.

In many applications, such as in a language laboratory, a need exists for a high fidelity, random access, durable recording medium. A further, desirable characteristic is that it be inexpensive.

Conventional commercially available tape systems have excellent fiedelity characteristics and, additionally, are durable being capable of approximately ten thousand passes without appreciable deterioration of fidelity. Moreover, present-day tape systems, due to mass production techniques, are relatively inexpensive. The main shortcoming of tape systems is that access to different portions of the tape requires a relatively large amount of time. Therefore, in an application such as in a language laboratory wherein frequent access to different portions of the tape is required, a single tape system cannot be used. Of course, a number of read stations operating independently at different relative portions of identical tapes could be used such that the time required for accessing a particular portion of the tapes could be decreased. Obviously, however, this would result in a relatively high cost language laboratory system, particularly where the laboratory is used simultaneously by a large number of students.

A disk magnetic recording configuration, on the other hand, will allow random access to different portions of the recorded material since all of it is available on one plane and can thus be accessed by a plurality of heads. Conventional plastic disk and needle combinations yield good fidelity output; however, their useable life is relatively short, being in the order of only one hundred passes prior to perceptible fidelity losses. Thus, in a language laboratory application, a conventional plastic disk and needle configuration would be unsatisfactory. One obvious solution to this problem of short life would be to utilize a random access, non-contact recording system such as is presently used in many computer systems. This type of system was tried which resulted in the identification of other problems particular to it. Thus, as would have been expected by one skilled in the art, if there is not intimate contact between the head and surface, the surface speed must be increased to obtain satisfactory number of cycles per second response. This severely limits the storage capacity of the disk. What is needed then is a disk which can be used in a contact recording environment without severely limiting the life of the magnetic recording material.

In conventional contact recording disks used in computer systems, the magnetic head rides on only one part of the head surface unless the head and disk are lapped almost geometrically flat. Lapping is an extremely expensive process. Normally the magnetic head tends to rock on the surface during operation which results in poor frequency response. The best frequency response available from an inexpensive system is that provided by a tape system. This is primarily because when a magnetic tape passes over a magnetic head, there is a slight elongation of the tape which allows it to have intimate contact with the curved pole tips of the head. Slight irregularities in the surface of the pole tips are therefore minimized because the tape distorts and follows the contour of the head. In tape systems head to tape spacing in the ten to thirty microinch range is well within the state of the art.

Ideally then, a magnetic recording system should include a disk for random accessing and should utilize contact recording for good fidelity along with large storage capabilities. This disk-contact recording configuration should additionally be relatively inexpensive, have a long life and be conducive to mass production techniques.

It is therefore an object of the present invention to provide a novel magnetic recording member.

Another object of the present invention is to provide a magnetic recording disk for contact recording purposes which is pliable to allow intimate contact with the pole tips of an associated magnetic head.

Another object of the present invention is to provide a random access magnetic recording system which is durable and has good fidelity characteristics.

Other and further objects and advantages of the invention will be apparent from the following more particular description of the preferred embodiment of the invention as illustrated in the accompanying drawings in which.

Figure 3A:
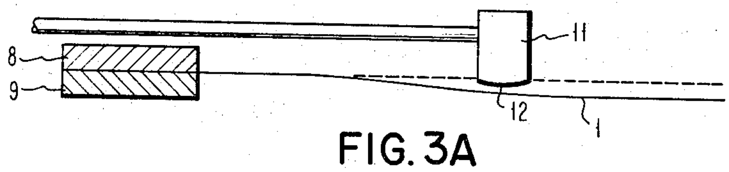

FIG. 3*a* is a side view illustrative of one problem encountered in a stretched membrane disk-head configuration where proper tension is not applied to the membrane.

Figure 3B:
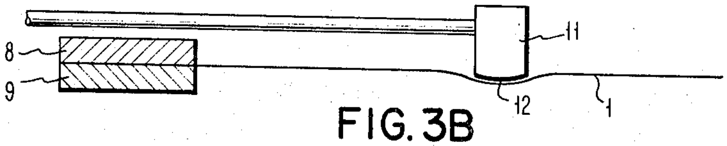
Figure 3C:
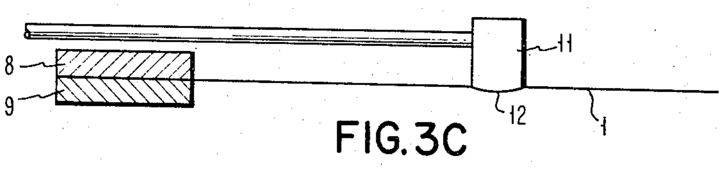

FIG. 3*b* is another view illustrative of a problem encountered in a stretched membrane disk-head configuration where proper pressure is not exerted on the magnetic recording head; and FIG. 3*c* is a view illustrative of the proper contact between a stretched membrane recording disk and a contact magnetic recording head.

Briefly, in the preferred embodiment of the present invention, a stretched, annular membrane magnetic recording disk is provided having a magnetic recording surface, which is under tension at tension points spaced substantially equidistant around its circumference to provide a recording surface, small areas of which are optically flat and which is pliable for contact recording purposes.

In endeavoring to come up with a random access recording disk wherein intimate contact, such as is achieved in tape systems, could be accomplished, several magnetic recording disk confiurations were experimented with. One type of disk constructed comprised a thin sheet of iron oxide coated Mylar (a polyethylene terephthalate polymer) with a foam rubber backing. When the pole tips of the magnetic head were brought into intimate contact with the recording surface of the disk and the disk rotated, good intimate contact between the pole tips and disk was achieved; however, ripples resulted which caused variations in the velocity of the magnetic material past the head which adversely affected the output from the head.

Figure 1:
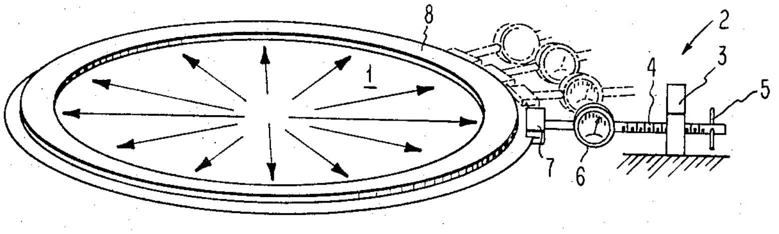
FIG. 1 is a view illustrating a classical method of applying tension to a membrane.

This problem lead applicant to seek to provide a disk wherein the Mylar type material on which the magnetic oxide was coated was held tightly to prevent rippling. Applicant built a rig for stretching a sheet of magnetically coated Mylar material. In actual practice, the rig that applicant built was not as is illustrated in FIG. 1; however, the rig of FIG. 1 will suffice. Application of radial tension to the sheet of Mylar material was applied at 60 tension points spaced equidistant around the circumference.

In FIG. 1 is shown a sheet of plastic material such as Mylar having a magnetic coating thereon which is commercially available and is produced through use of mass production techniques. This is an off-the-shelf item. The magnetic membrane 1 is cut in roughly a circular configuration and is grasped by a plurality of stretching means generally designated at 2. As previously stated, in actual practice the material was stretched by simultaneous application of tension at 60 points equally spaced around the circumference. Each stretching means 2 has a frame member 3 having a threaded screw opening therethrough such that rotation of a screw 4 by means of arm 5 results in travel of the screw through the frame member 3. Attached to one extremity of the screw is a gage 6 which may be a conventional strain gage for measuring the tension applied to the magnetic membrane 1. The opposite side of the strain gage 6 is connected to a grasping or holding means such as a pinch jaw 7 which grasps the magnetic membrane 1. As previously stated, any number of these or similar type stretching means having means for measuring the tension applied to the magnetic membrane may be circumferentially located around the magnetic membrane. Obviously, the greater the number of individual stretching points, the more uniform the resulting tension applied to the magnetic membrane 1 will be.

Figure 2:
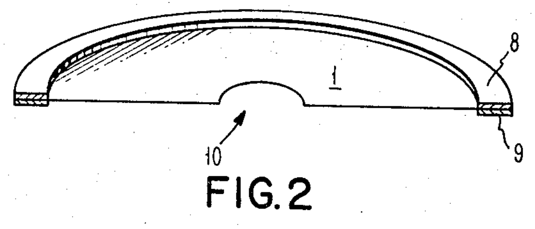
FIG. 2 is a partial cutaway perspective of a completed, stretched membrane disk.

After proper radial tension force has been applied to each of the tension points around the circumference, two thin aluminum rings 8 and 9, as better shown in FIG. 2, are glued on opposite sides of the membrane 1 by means of epoxy or a similar type resin. While two rings are shown, as is obvious only one ring need be utilized. After the resin dries, an annulus may be cut in the center of the membrane 1 where the application dictates. Then it is removed from the plurality of stretching means and any excess membrane extending beyond the aluminum rings 8 and 9 is removed.

In applying radial tension to a membrane, enough tension force must be applied thereto such that, as shown in FIG. 3*a*, the membrane 1 will not retreat from the pole tips 12 of the magnetic head 11 as the head is brought down toward it for contact recording purposes. If the membrane is relatively loose, as illustrated in FIG. 3*a*, the head can still be made to contact it; however, rippling will occur which will result in variations of velocity of the membrane past the head. Additionally, as shown in FIG. 3*b*, even if proper radial tension is applied to the membrane 1, care must be taken to assure that the associated magnetic head 11 has enough pressure applied to it such that it will overcome any air bearing which may tend to form between the pole tips 12 and membrane 1, and that the membrane will be in intimate contact with the pole tips. In FIG. 3*c* is shown the proper relationship between a stretched membrane and the pole tips of a magnetic recording head. Thus, a slight indentation of the pole tips 12 into the surface of the stretched membrane 1 must be accomplished. There is not only an optimum tension of the stretched membrane, but, additionally, there is an optimum diameter of the head such that when the head moves on the magnetic surface, it indents itself and provides the same type of initimate contact as is provided in a tape system while at the same time there is no variation in velocity between the membrane 1 and the head caused by ripples as the head moves either radially or circumferentially.

Generally, it may be stated that with respect to radial tension force the tighter the membrane the better up to the point that the Mylar starts to yield. It is well known that Mylar, if stretched too tight, will gradually yield. Through numerous experiments, it was determined that the proper stress to be applied is approximately 5000 pounds per square inch. This was determined by actually ruling on the surface of the membrane grids and then applying tension to the membrane while watching the grids through a microscope as tension is increased. This not only provided an indication as to when the membrane yielded, but, additionally, provided an indication as to the uniformity of the tension applied.

Further tests with respect to the diameter of the head showed that excellent results are achieved when the radius of the pole tips of the head is approximately three inches. This is in contrast to the radius of the pole tips of gliding recording heads which is normally several feet.

Theoretically, it can be shown that when a round piece is cut from the center of a stretched membrane to provide an annulus 10 of the type shown in FIG. 1, the tangential tension around the annulus will increase. Thus, it might be expected that the membrane would tear or wave around the annulus 10. As theory would lead one to expect, there was a noted increase in tangential tension around the annulus 10 when it was cut in the stretched membrane. However, it was observed that if proper stress in the order of 5000 pounds per square inch was applied to the membrane 1 prior to cutting the annulus 10, there would be no tearing around the annulus nor would there be a tendency for the material around it to wave. If too much stress were applied to the membrane prior to cutting the annulus, tearing would result or alternately waving of the material around the annulus would result. As shown in FIG. 3*a*, if too little stress were applied to the membrane 1, the required rigidity would not be present and the membrane 1 would retreat from the head 11 when contact recording is attempted.

The disk configuration permits the use of Mylar, which has been coated with a magnetic material in a continuous long web by high production techniques. Mylar coated with magnetic material is relatively inexpensive, the cost of material for a fourteen inch disk being approximately $.25. Thus, an extremely inexpensive disk surface is provided which, due to the fact that it is a stretched membrane, it optically flat without requiring grinding or lapping. It will be, of course, obvious to those skilled in the art that the disk is optically flat over only small areas as distinguished from being optically flat over its entire surface. If the rings 8 and 9 were true, it would be optically flat over its whole surface. The flatness of small areas, however, is all that matters because this is all the head sees. Laboratory measurements have established that over small areas a disk of the herein described stretched membrane type is flat within a few wave lengths of light.

Another advantage over tape systems of the subject stretched membrane disk is that while utilizing the stretched membrane disk, constant velocities of magnetic material past an associated head can be provided. One of the shortcomings of magnetic tape systems is that it is extremely difficult to provide uniform velocity tape movement past an associated magnetic head. This is the main source of flutter and wow in a tape system. In magnetic tape systems the tape is normally pinched between pinch rollers or is driven by a driving captsan with a consequent tendency to slip. In the subject embodiment the drive to the disk may be by means of the rings 8 and 9 where, as is obvious, a more firm drive can be applied than to a magnetic tape surface.

A final advantage of the subject stretched membrane disk over both magnetic tape units and plastic record and needle disk arrangements is that of durability. Actual life tests were performed on a stretched membrane disk. With a magnetic head in intimate contact with the recording surface in a manner such that the membrane deforms around the contour of the surface of the head, it ran for 22,000 passes before the magnetic material peeled off and ran for 16,000 passes before there was a perceptible loss in fidelity. As previously stated, tape deteriorates after approximately 10,000 passes while the fidelity from a plastic disk-needle arrangement deteriorates appreciably after 100 passes and the disk itself deteriorates after approximately 10,000 passes.

While the invention has been particularly shown and described with reference to a prefrered embodiment thereof, it will be understood by those skilled in the art that the foregoing and other changes in the form and details may be made therein without departing from the spirit and scope of the invention.

What is claimed is:

1. A magnetic recording apparatus wherein the curved pole tips of a magnetic head are held in pressure contact with a recording medium, said apparatus being adapted for rotation for recording and reading and comprising:

a round, support membrane having a recording medium thereon, said membrane being under radial tension at points spaced substantially equidistant about its circumference, and the pressures on both sides of said membrane being substantially equal during rotation thereof for recording and reading, the radial tension exerted on said membrane being less than enough to cause it to yield, but being sufficient to render said membrane substantially microscopically flat during rotation thereof for recording and reading, and means for holding said membrane in said state of radial tension such that said membrane deforms around the pole tips of said magnetic head and is in intimate contact therewith.

2. The combination of claim 1 wherein the stress resulting from said radial tension is between 4000 and 6000 pounds per square inch.

3. A magnetic recording apparatus wherein the curved pole tips of a magnetic head are held in pressure contact with a recording medium, said apparatus being adapted for rotation for recording and reading and comprising:

a round, support membrane having a recording medium thereon and an annulus formed therein, said membrane being under radial tension at points spaced substantially equidistant about its circumference and the pressures on both sides of said membrane being substantially equal during rotation thereof for recording and reading, the radial tension exerted on said membrane being less than enough to cause it to yield, but being sufficient to render said membrane substantially microscopically flat during rotation thereof for recording and reading, and means for holding said membrane in said state of radial tension such that said membrane deforms around the pole tips of said magnetic head and is in intimate contact therewith.

References Cited

UNITED STATES PATENTS

| | | | |
|---|---|---|---|
| 3,336,583 | 8/1967 | Comstock | 179—100.2 |
| 3,334,193 | 8/1967 | Dow | 179—100.2 |
| 2,535,480 | 12/1950 | Begun | 179—100.2 |
| 3,036,304 | 5/1962 | Willard | 340—174.1 |
| 3,130,110 | 4/1964 | Schmidt | 346—74 |
| 3,212,075 | 10/1965 | Damerau et al. | 340—174.1 |
| 3,290,692 | 12/1966 | Jacoby | 346—74 |

BERNARD KONICK, *Primary Examiner.*

L. G. KURLAND, A. I. NEUSTADT, *Assistant Examiners.*